United States Patent
Greenhalgh et al.

(10) Patent No.: US 6,375,123 B1
(45) Date of Patent: Apr. 23, 2002

(54) AIR REFUELING DROGUE

(75) Inventors: Samuel Greenhalgh, Doylestown; Ellis Skott Greenhalgh, Wyndmoor; Matthew T. Douglass, Philadelphia, all of PA (US); Ronald H. Garber, Orlando, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/639,295

(22) Filed: Aug. 15, 2000

(51) Int. Cl.$^7$ ................................................ B64D 37/00
(52) U.S. Cl. .................................................. 244/135 A
(58) Field of Search ................................ 141/229, 382, 141/387, 388; 137/899.2; 244/135 A

(56) References Cited

U.S. PATENT DOCUMENTS

| | | | | |
|---|---|---|---|---|
| 2,823,881 A | * | 2/1958 | Patterson | |
| 2,946,543 A | * | 7/1960 | Gordon et al. | |
| 2,998,949 A | * | 9/1961 | Patterson | |
| 3,061,246 A | * | 10/1962 | Kirby | |
| 3,108,769 A | * | 10/1963 | Hieber | |
| 5,255,877 A | * | 10/1993 | Lindgren et al. | 244/135 A |
| 5,427,333 A | * | 6/1995 | Kirkland | 244/135 A |
| 5,871,173 A | * | 2/1999 | Frank et al. | 244/1 TD |
| 5,921,294 A | * | 7/1999 | Greenhalgh et al. | 141/279 |
| 6,119,981 A | * | 9/2000 | Young et al. | 244/135 A |
| 6,145,788 A | * | 11/2000 | Mouskis et al. | 244/135 A |

\* cited by examiner

*Primary Examiner*—Peter M. Poon
*Assistant Examiner*—Kevin Jakel
(74) *Attorney, Agent, or Firm*—Ron Billi

(57) ABSTRACT

A refueling drogue for rearward deployment from a tanker aircraft into an air stream includes a fuel valve for receiving fuel from the tanker aircraft and controlling a flow of the fuel; a coupling attached to the fuel valve for receiving fuel from the fuel valve; and a plurality of struts, each strut having a proximal end and a distal end wherein each strut is rotatably connected to the coupling at the proximal end and each strut includes a winglet at the distal end.

14 Claims, 4 Drawing Sheets

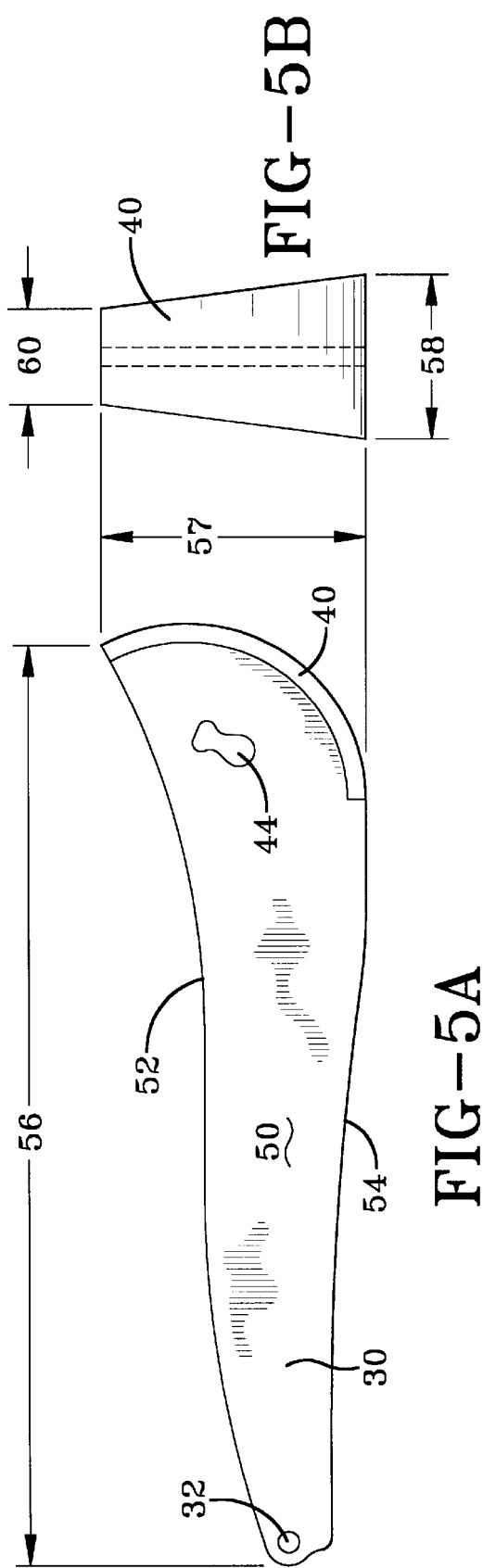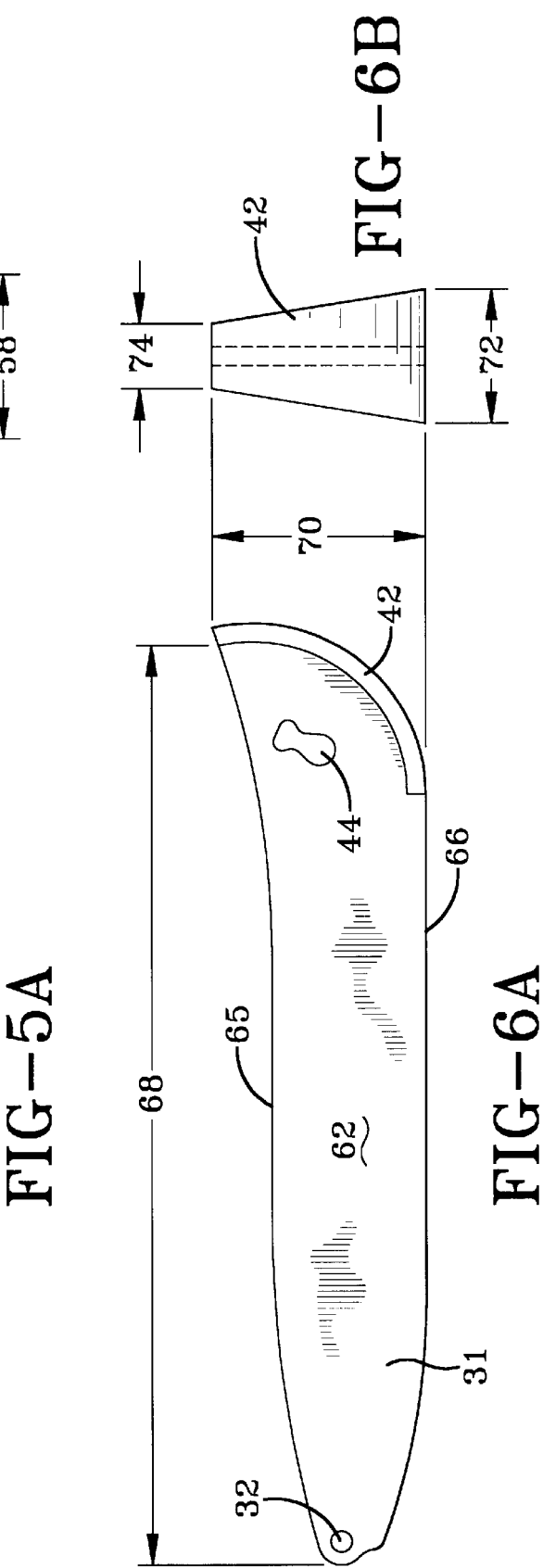

AIR REFUELING DROGUE

STATEMENT OF GOVERNMENT INTEREST

The invention described herein may be manufactured and used by or for the Government of the United States of America for government purposes without the payment of any royalties therefor.

BACKGROUND OF THE INVENTION

The present invention relates in general to inflight refueling devices for aircraft, commonly known as drogues. In particular, the present invention relates to an air refueling drogue that is attached to a fuel hose and deployed rearwardly from the storage pod of a tanker aircraft to provide a bell shaped, stable target for a receiving aircraft in need of fuel.

Many long endurance missions require that aircraft have to be refueled in the air (literally on the fly). Such an operation requires a tanker aircraft and a means for transferring fuel from the tanker aircraft to the receiving aircraft. One widely used method for conducting such an operation includes the inflight deployment of a drogue and fuel transfer hose from a tanker aircraft into the airstream.

The tanker aircraft has a refueling pod attached to it. In the pod is a reel arrangement which holds a fuel hose, typically fifty feet in length. Attached to the end of the fuel hose is a valving device called a coupling and a drag/target device called a drogue. The drogue is stored in the rear part of the refueling tanker pod. When a receiving aircraft requires refueling, the drogue is ejected by a spring from the back of the pod into the airstream. After clearing the back of the pod, aerodynamic forces acting on the drogue are used to set up the final deployment of the system.

The aerodynamic drag on the drogue pulls the refueling hose and coupling out of the pod. The aerodynamic drag provides the major force to unreel the fuel hose and also provides the resistive force for the receiving aircraft probe. A probe in the receiving aircraft is then brought into alignment with the drogue and forcibly inserted and locked into a coupling device located at the center of the drogue. The probe on the receiving aircraft has to overcome the coupling valve and latching forces. The probe must be fully locked in place before fuel is transferred between the tanker and the receiving aircraft. The drogue also produces aerodynamic stabilizing by providing damping forces on the refueling system.

Although drogues have worked effectively for many years, there are many inadequacies. Prior drogues are complex, employing over 780 metal parts and a fabric ring parachute. A single failure can be disastrous and become "foreign object damage" (FOD) if ingested by the receiving aircraft jet engine. In addition, prior drogues are costly to build, repair and maintain. Sometimes the probe on the receiving aircraft can become entangled or even pierce the fabric canopy on prior drogues thereby damaging the drogue assembly and preventing the refueling operation. In addition, the drogue must be small enough to be easily stored in the storage pod of the tanker aircraft yet be large enough when deployed to allow the pilot of the receiving aircraft to insert and lock the refueling probe.

It is therefore desirable that a drogue have a minimum number of parts to reduce FOD potential. It is also desirable that a drogue be of a design that results in a minimal cost to build, repair and maintain. At the same time, it is desirable that a drogue be collapsible for the purpose of storage and expandable for the purpose of presenting a large target. It is also desirable that the drogue be durable to withstand repeated altercations with the probe of the receiving aircraft.

SUMMARY OF THE INVENTION

It is an object of the present invention to provide a drogue that will have minimum FOD potential.

It is a further object of the present invention to provide a drogue that will be inexpensive to build, repair and maintain.

It is another object of the present invention to provide a drogue that will fly in a predictable stable manner.

It is still another object of the present invention to provide a drogue that will easily open up when ejected into the airstream and easily collapse when withdrawn back into the storage pod.

It is also an object of the present invention to provide a durable drogue that can withstand repeated altercations with a refueling probe.

The present invention provides a refueling drogue for rearward deployment from a tanker aircraft into an air stream, comprising a fuel valve for receiving fuel from the tanker aircraft and controlling a flow of the fuel; a coupling attached to the fuel valve for receiving fuel from the fuel valve; and a plurality of struts, each strut having a proximal end and a distal end wherein each strut is rotatably connected to the coupling at the proximal end and each strut includes a winglet at the distal end.

Preferably, each strut includes an opening at the distal end, the refueling drogue further comprising a cord disposed in the opening at the distal end of each strut thereby limiting expansion of the plurality of struts.

The refueling drogue further comprises a ring assembly for attaching the plurality of struts to the coupling wherein each strut includes a second opening at the proximal end for attaching the strut to the ring assembly.

In a preferred embodiment, each strut and winglet are integrally molded from a high molecular weight plastic material.

The plurality of struts preferably comprises a set of long struts and a set of short struts. The long and short struts are connected in an alternating manner to the coupling. Winglets on the long struts are wider than winglets on the short struts.

In one embodiment, each strut includes an internal surface configured such that the plurality of struts provides a substantially bell-shaped opening. Further, each strut includes an external surface and two side surfaces, a surface area of the side surfaces being substantially greater than a surface area of the internal and external surfaces.

Further objects, features and advantages of the invention will become apparent from the following detailed description taken in conjunction with the following drawing.

BRIEF DESCRIPTION OF THE DRAWING

FIG. 5A is a side view of the longer strut of the present invention.

FIG. 5B is an end view of the winglet portion of the strut of FIG. 5A.

FIG. 6A is a side view of the shorter strut of the present invention.

FIG. 6B is an end view of the winglet portion of the strut of FIG. 6A.

DETAILED DESCRIPTION OF THE PREFERRED EMBODIMENTS

Figure 1:
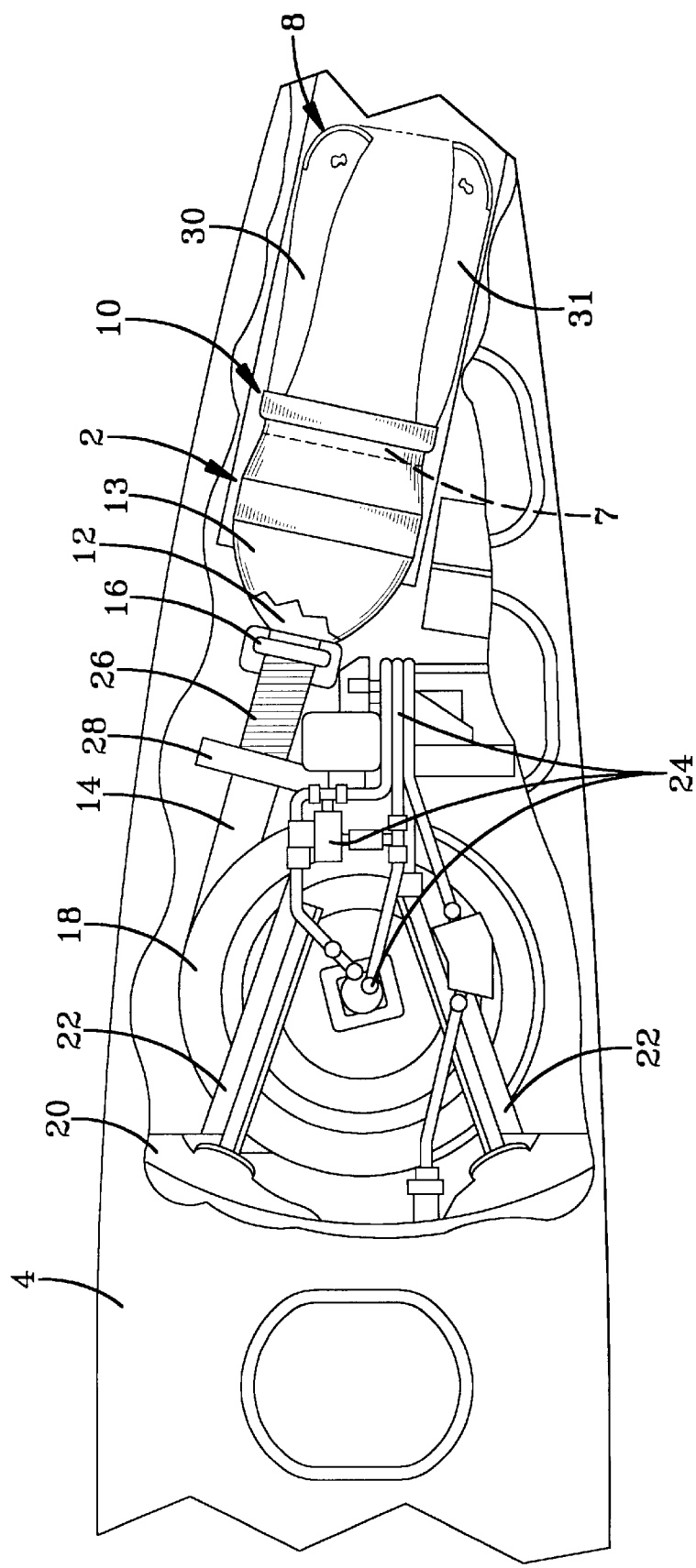
FIG. 1 is a side view, partially cut away, showing an embodiment of the present invention located in the storage pod of a tanker aircraft.

In prior drogues, the major aerodynamic forces are produced by a fabric canopy that is attached by thin spring clips to the struts. These spring clips sometimes break or snap off and become possible engine FOD. Also, if the clips break, the fabric canopy can become misshapen and produce very large disturbing aerodynamic forces to the drogue system as a whole. Prior drogues have been driven into large circular loops by a damaged fabric drogue system, usually due to missing spring clips. When this happens, the drogue describes a 12 foot or larger circular loop making it virtually impossible for the receiving aircraft to couple up and receive fuel. This quickly becomes a critical problem for the safety of the aircraft and a life threatening situation for the pilot of the aircraft.

The drogue of the present invention works in a similar manner to prior drogues, except that the major aerodynamic forces in the inventive drogue are generated by integral solid winglets. By using aerodynamic lifting forces on the winglets of the drogue of the present invention, the drogue opens up to provide a large, stable catching target for the pilot of the receiving aircraft.

Additionally, in prior drogues, the struts are connected together by dozens of triball assemblies. Prior drogues employ 144 tri-ball assemblies to hold the struts together after deployment into the airstream. The tri-ball assemblies comprise a short piece of wire rope with three swaged balls spaced evenly along the length. Therefore, in prior drogues, there are 576 small metal objects that have the potential of breaking off and becoming FOD for the receiving aircraft engine. The triball wires may break and the 3/16 inch steel balls could be ingested in the engine of the receiving aircraft. In the present invention, the struts are connected together by a single knotted cord. Thus, the potential for FOD is greatly reduced.

By greatly simplifying the design of the drogue, the parts count has been reduced from 780 parts for prior drogues down to about 55 parts for the inventive drogue. In prior drogues, all of the 780 parts were made of metal. In the present invention, only about 19 parts are made of metal, the remaining parts being made of a high molecular weight plastic. The drogue of the present invention is designed so that the few remaining metal parts will most likely not produce FOD.

In the present invention, the drogue struts are made from a high molecular weight plastic material that is highly wear resistant but much softer than prior aluminum struts. Therefore, the present invention will reduce collateral damage in the event that inadvertent contact is made between the drogue and the receiving aircraft.

The present invention uses shorter struts so that the refueling system does not protrude out from the rear of the refueling pod. The shorter struts do not interfere with the landing gear and allow the F18 aircraft to be used as a refueling tanker. The internal contouring of the edge of the struts of the invention is designed to ease the probe into the coupling, thereby facilitating the process of aligning the drogue with the mating probe.

Figure 2:
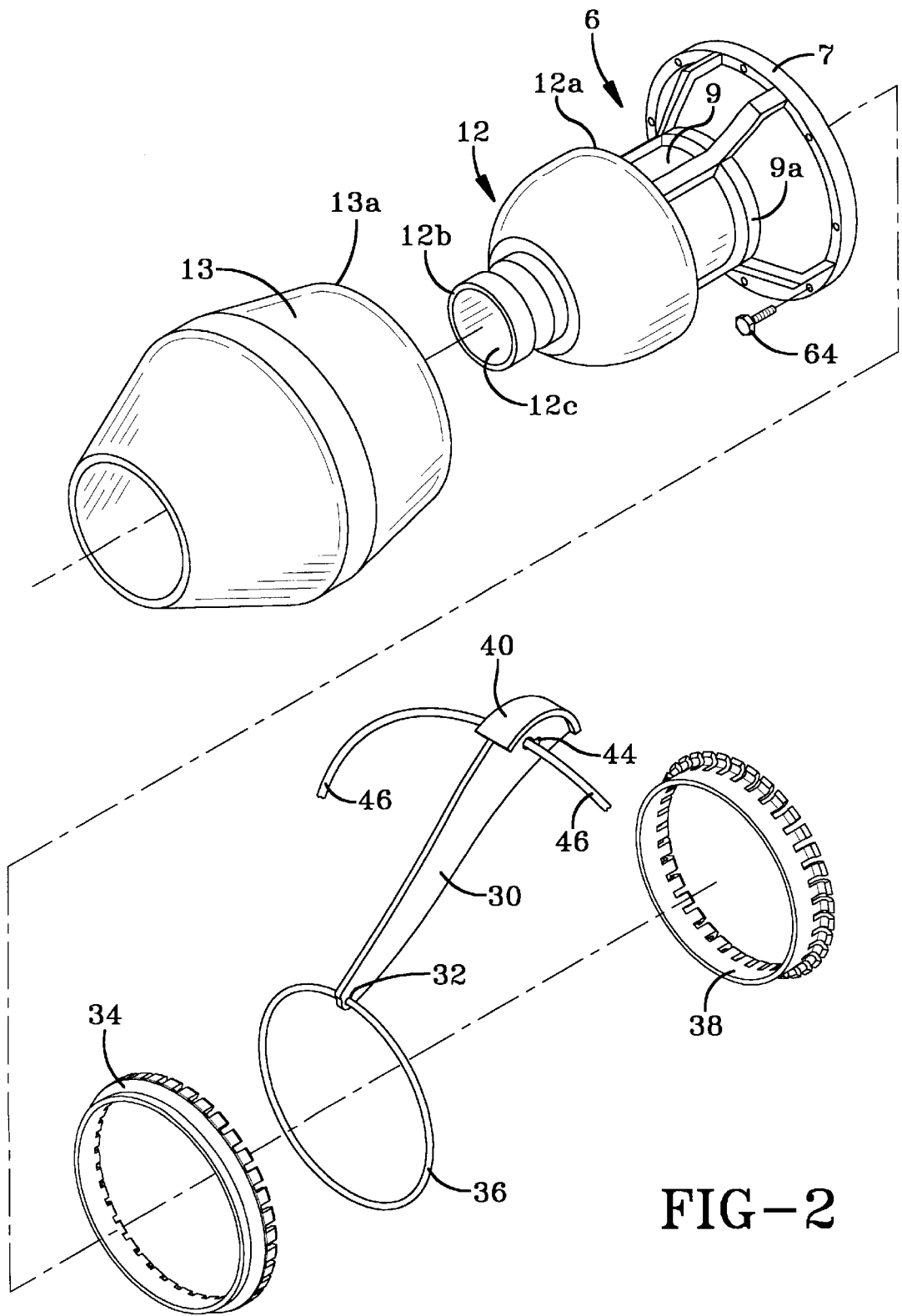
FIG. 2 is an exploded view of an embodiment of the present invention showing a strut, the ring assembly and the coupling assembly.

Referring to FIGS. 1 and 2, drogue 2 is located in the rearward portion of tanker storage pod 4 and includes coupling 6, basket 8, ring assembly 10, fuel valve 12, and shroud 13. One end of refueling hose 14 is attached to fuel valve 12 by means of swivel connector 16 and the other end of hose 14 is coiled around hose reel 18 and attached to a fuel source within the tanker aircraft. As shown in FIG. 2, fuel is delivered to inlet 12c and flows through valve 12 and coupling 6 to outlet 9a. Valve 12 controls the flow of fuel to outlet 9a. Hose reel 18 is rotatably attached to bulkhead 20 by a plurality of supports 22 which allow hose reel 18 to rotate in either the clockwise or counterclockwise direction and thereby reel in or pay out refueling hose 14. Control mechanism 24 hydraulically controls the positioning of hose reel 18. Other control positioning means may be employed by those skilled in the art. Shroud 13 covers fuel valve 12 and edge 13a abuts flange 7. Shroud 13 is shaped to provide a uniform (laminar) airflow to struts 30,31. Spring 26 is interposed between stop 28 and swivel connector 16 and is shown in FIG. 1 in the compressed (storage) position.

Drogue 2 is ejected out of storage pod 4 and into the airstream by allowing reel 18 to rotate to pay out hose 14. As reel 18 begins to rotate, spring 26 releases stored energy to initially eject drogue 2 out of storage pod 4 and into the airstream. Once in the airstream, aerodynamic (drag and lift) forces act on drogue 2 thereby tensioning hose 14 and opening up the drogue. Hose 14 (and drogue 2) may then be allowed to extend to its full length (about 50 ft in the preferred embodiment) by controlling the rotation of reel 18. Drogue 2 may be pulled back into storage pod 4 by causing reel 18 to rotate in the opposite direction. Reel 18 is tension sensitive. That is, reel 18 will maintain a constant tension in hose 14 by either reeling in hose 14 or paying out hose 14 in response to the tension in hose 14. Should the receiving aircraft push, pull or otherwise move drogue 2 and thereby cause the tension of hose 14 to vary out of a prescribed range, reel 18 will be caused to rotate to maintain the tension within the prescribed range.

As seen in FIG. 2, a known ring assembly 10 comprises an inner ring 34, an intermediate ring 36 and an outer ring 38. Each strut 30,31 includes an opening 32 at a proximal end thereof. The struts 30,31 are mounted on intermediate ring 36 by way of openings 32. While FIG. 2 shows only one strut 30 mounted on intermediate ring 36, it should be understood that a plurality of struts 30,31 are similarly mounted on intermediate ring 36. Intermediate ring 36 with struts 30,31 attached is inserted in inner ring 34 and held therein by fastening outer ring 38 to inner ring 34. The ring assembly 10 is attached to flange 7 by bolts 64. The struts 30,31 are free to pivot or rotate about intermediate ring 36. In a preferred embodiment, the number of struts 30,31 is 36.

Coupling 6 includes flange 7 and housing 9. Coupling 6 is rigidly attached to end 12a of fuel valve 12. A suitable and preferred coupling 6 and fuel valve 12 is model #MA-2, manufactured by Sargent Fletcher, J. C. Carter or Parker Hannifin. Other couplers and fuel valves may be utilized by those skilled in the art. As shown in FIG. 2; end 12b of fuel valve 12 provides an attachment point for fuel hose 14. Fuel valve 12 and coupling 6 provide a continuous fluid path between end 12b and end 9a via bore 12c.

Figure 3:
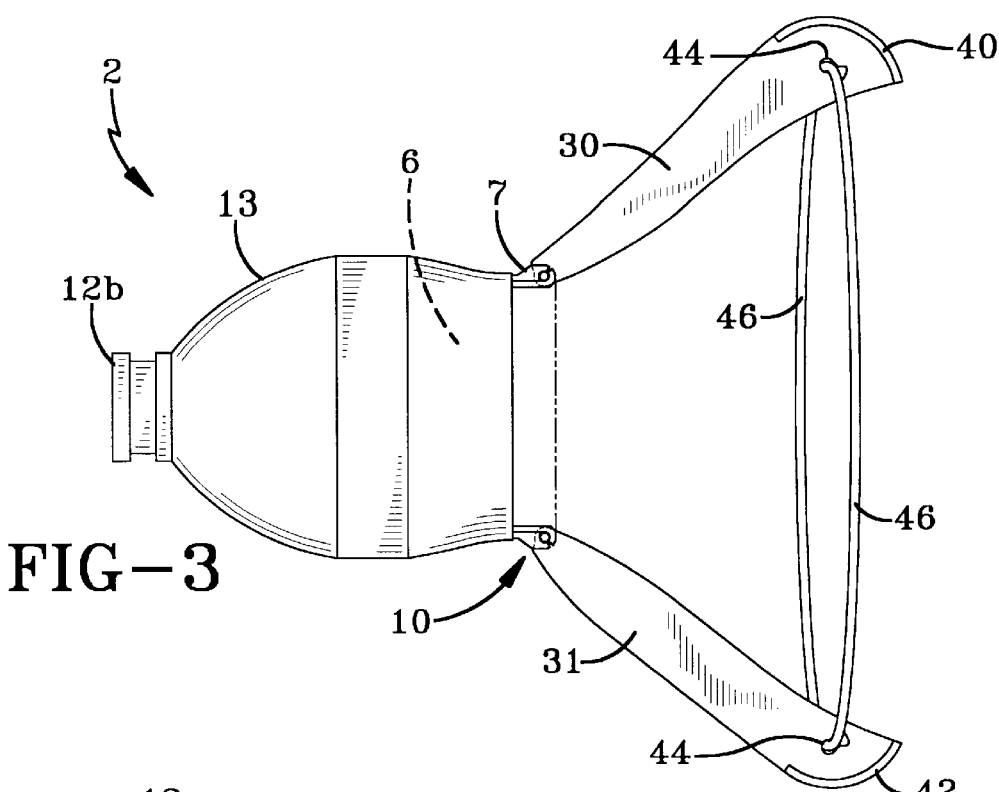
FIG. 3 is a side view of an embodiment of the present invention showing two struts in the open or deployed state.
Figure 4:
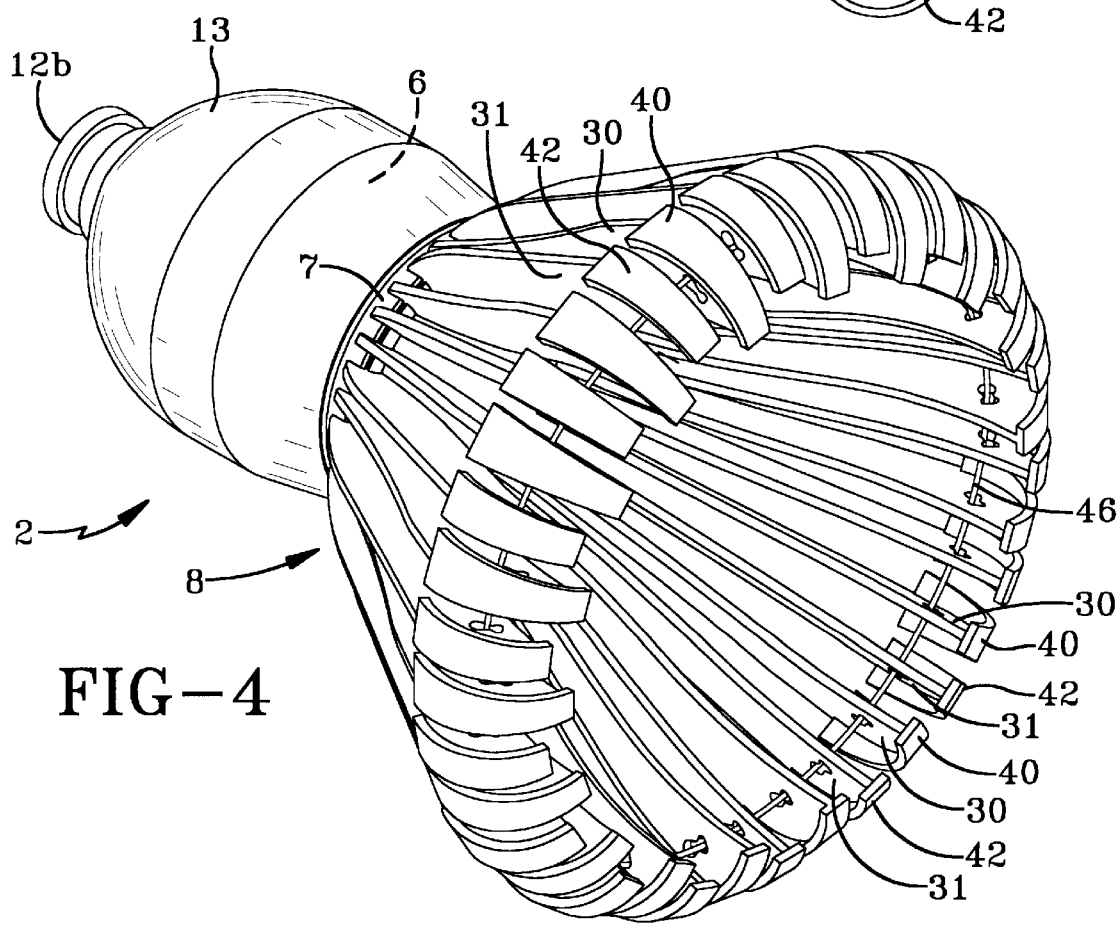
FIG. 4 is a perspective view of an embodiment of the present invention showing the drogue in the open or deployed state.

FIG. 3 is a side view of an embodiment of the drogue 2 of the present invention showing two struts 30,31 in the open or deployed state. FIG. 4 is a perspective view of an embodiment of the drogue 2 of the present invention showing the drogue in the open or deployed state. FIGS. 3 and 4 show struts 30,31 in the loaded condition, that is, when drogue assembly 2 is deployed in the airstream at a velocity of approximately 325 KIAS. In this condition, struts 30,31 expand outwardly against the aerodynamic (drag) forces. In a preferred embodiment, cord 46 forms a generally circular continuous band through the distal ends of struts 30,31. Cord 46 communicates with openings 44 located in the distal ends of struts 30,31. Cord 46 limits the maximum expansion of struts 30,31 to about 28 inches. Cord 46 is preferably made from a high density plastic material. The cord 46 replaces the complex triball assemblies of prior drogues.

In its closed state, the drogue basket 8 must collapse and fit into the tanker storage pod 4. In one embodiment, the basket 8 is made to fit in the pod 4 by using struts 30,31 of different lengths. Struts 30 are longer than struts 31. The struts 30,31 are positioned alternately around the circumference of the basket 8. That is, each strut 30 is adjacent two struts 31 and vice versa. In a preferred embodiment, the number of struts 30 is 18 and the number of struts 31 is 18. Preferably, the winglets 40 on the longer struts 30 are wider than the winglets 42 on the shorter struts 31. The struts 30,31 are made of a high molecular weight, high density plastic material. The winglets 40,42 are molded integrally with their respective strut 30,31.

FIG. 5A is a side view of the longer strut 30 of the present invention. FIG. 5B is an end view of the winglet portion 40 of the strut 30 of FIG. 5A. Strut 30 includes an opening 32 at a proximal end thereof for attachment to the ring assembly 10. Another opening 44 is formed at a distal end of the strut 30 for receiving the cord 46. Preferably, the opening 44 is a keyhole shaped opening to facilitate installation of the cord 46. The cord 46 is knotted on either side of strut 30 to maintain positioning of the struts in the circumferential direction. The keyhole shaped opening 44 allows the cord 46 to be easily threaded through the larger part of the keyhole shaped opening and then pulled into place in the smaller part of the keyhole shaped opening. As shown in FIG. 6A, the shorter strut 31 also includes an opening 32 at a proximal end and an opening 44 at a distal end.

Referring to FIGS. 5A and B, strut 30 includes two side surfaces 50, an internal surface 52 and an external surface 54. The internal surfaces 52 of the struts 30 form a substantially bell-shaped opening that helps guide the probe of the aircraft to be refueled into the drogue basket 8. A length 56 of strut 30 is about 15.9 inches. A width 57 of strut 30 is about 5 inches. A width of the internal surface 52 and external surface 54 is about 0.375 inches. It can be seen that the side surfaces 50 are substantially greater in surface area than the internal and external surfaces 52,54. The winglet 40 tapers inwardly from the external surface 54 to the internal surface 52. In a preferred embodiment, the winglet 40 tapers from a width 58 of about 3 inches to a width 60 of about 1.7 inches. The thickness of the winglet 40 is about 0.125 inches. The angular extent of the winglet 40 on the external surface 54 of the strut 30 is about 120 degrees.

FIG. 6A is a side view of the shorter strut 31 of the present invention. FIG. 6B is an end view of the winglet portion 42 of the strut 31 of FIG. 6A. Strut 31 includes two side surfaces 62, an internal surface 65 and an external surface 66. The internal surfaces 65 of the struts 31 form a substantially bell-shaped opening that helps guide the probe of the aircraft to be refueled into the drogue basket 8. A length 68 of strut 31 is about 15.6 inches. A width 70 of strut 31 is about 4 inches. A width of the internal surface 65 and external surface 66 is about 0.375 inches. It can be seen that the side surfaces 62 are substantially greater in surface area than the internal and external surfaces 65,66. The winglet 42 tapers inwardly from the external surface 66 to the internal surface 65. In a preferred embodiment, the winglet 42 tapers from a width 72 of about 1.5 inches to a width 74 of about 0.75 inches. The thickness of the winglet 42 is about 0.125 inches. The angular extent of the winglet 42 on the external surface 65 of the strut 31 is about 120 degrees.

If necessary, an additional cord 46 and a set of keyholes mid length of each strut may be added. The additional cord would strengthen the structural integrity of the assembly and help prevent aircraft probe punch through. Lighting and/or illumination may be incorporated into the drogue assembly to assist in low visibility refueling.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. A refueling drogue for rearward deployment from a tanker aircraft into an air stream, comprising:
   a fuel valve for receiving fuel from the tanker aircraft and controlling a flow of the fuel;
   a coupling attached to the fuel valve for receiving fuel from the fuel valve; and
   a plurality of struts, each strut having a proximal end and a distal end wherein each strut is rotatably connected to the coupling at the proximal end and each strut includes a winglet at the distal end, the winglet providing a lifting force to open the refueling drogue.

2. The refueling drogue of claim 1 wherein each strut includes an opening at the distal end, the refueling drogue further comprising a cord disposed in the opening at the distal end of each strut thereby limiting expansion of the plurality of struts.

3. The refueling drogue of claim 2 further comprising a ring assembly for attaching the plurality of struts to the coupling wherein each strut includes a second opening at the proximal end for attaching the strut to the ring assembly.

4. The refueling drogue of claim 2 wherein the opening at the distal end of each strut has a generally keyhole shape.

5. The refueling drogue of claim 1 wherein each strut and winglet are integrally molded from a high molecular weight plastic material.

6. The refueling drogue of claim 1 wherein each strut includes an internal surface configured such that the plurality of struts provides a substantially bell-shaped opening.

7. The refueling drogue of claim 6 wherein each strut includes an external surface and two side surfaces, a surface area of the side surfaces being substantially greater than a surface area of the internal and external surfaces.

8. A refueling drogue for rearward deployment from a tanker aircraft into an air stream, comprising:
   a fuel valve for receiving fuel from the tanker aircraft and controlling a flow of the fuel;
   a coupling attached to the fuel valve for receiving fuel from the fuel valve; and
   a plurality of struts, each strut having a proximal end and a distal end wherein each strut is rotatably connected to the coupling at the proximal end and each strut includes a winglet at the distal end and further wherein the plurality of struts comprises a set of long struts and a set of short struts.

9. The refueling drogue of claim 8 wherein the long and short struts are connected in an alternating manner to the coupling.

10. The refueling drogue of claim 9 wherein a number of long struts is 18 and a number of short struts is 18.

11. The refueling drogue of claim 8 wherein winglets on the long struts are wider than winglets on the short struts.

12. The refueling drogue of claim 8 wherein a length of the long struts is about 15.9 inches.

13. The refueling drogue of claim 8 wherein a length of the short struts is about 15.6 inches.

14. A refueling drogue for rearward deployment from a tanker aircraft into an air stream, comprising:

- a fuel valve for receiving fuel from the tanker aircraft and controlling a flow of the fuel;
- a coupling attached to the fuel valve for receiving fuel from the fuel valve; and
- a plurality of struts, each strut having a proximal end and a distal end wherein each strut is rotatably connected to the coupling at the proximal end, each strut includes a winglet at the distal end, each strut includes an internal surface configured such that the plurality of struts provides a substantially bell-shaped opening, each strut includes an external surface and two side surfaces, a surface area of the side surfaces being substantially greater than a surface area of the internal and external surfaces and wherein each winglet tapers in width from the external surface of the strut to the internal surface of the strut.

* * * * *